J. W. Dryer.

Mold for Casting Sleigh Shoes.

N° 86,655.    Patented Feb. 9, 1869.

Witnesses:    Inventor:
Ira A. Hibbard    J. W. Dryer
I. W. Lorenzo, Jr.    By Wm. F. Loughborough
    Atty

JOHN W. DRYER, OF MACEDON, NEW YORK.

Letters Patent No. 86,655, dated February 9, 1869.

IMPROVEMENT IN MOULD FOR CASTING SLEIGH-SHOES.

The Schedule referred to in these Letters Patent and making part of the same.

*To all whom it may concern:*

Be it known that I, JOHN W. DRYER, of Macedon, in the county of Wayne, in the State of New York, have invented a new and useful Chilled Cast-Iron Sleigh-Shoe; and I do hereby declare that the following is a full, clear, and exact description thereof, reference being had to the accompanying drawing, making part of this specification, in which—

This invention consists in providing a proper device for chilling and hardening sleigh-shoes.

To enable others to make and use my invention, I will describe its construction and operation.

Figure 2:
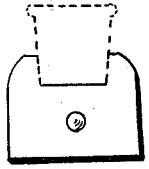
Figure 2 is a cross-section, showing the sides of the mould.

I make a mould, of cast-iron, the desired shape of the sleigh-shoe, having a bottom and two sides, as shown in fig. 2.

The sides are made as high as the chill is required to extend up and in the casting.

Figure 1:
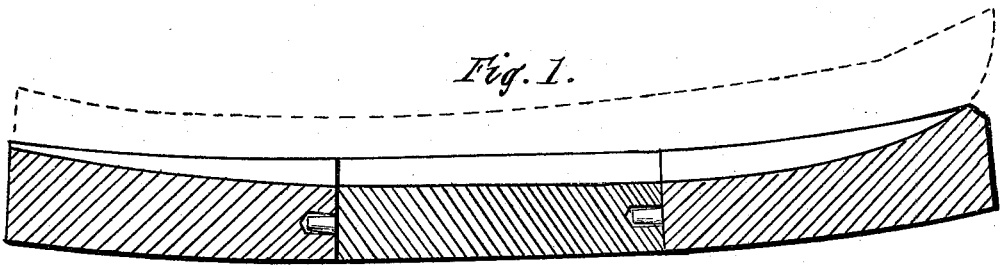
Figure 1 is a longitudinal section, showing the dowel-pins.

This mould is made in two or more sections, as shown in fig. 1, and the parts are held together by two or more dowel-pins.

As the iron runs into this mould, the part of molten iron coming in contact with it becomes chilled, and consequently harder than if cast in sand.

If the mould is not made in sections, it is apt to spring by the heat of the casting, and it will not be the proper shape for a sleigh-shoe.

I find, by a series of experiments, that, by making the mould in sections, the casting does not affect it, and the sleigh-shoe cools in the proper shape, as shown in fig. 1.

The chilling cast-iron sleigh-shoes is a great object, where it can be done so as to have a proper thickness, as it hardens them, so that they do not wear out as soon, and causes the sleigh to slip over stones or bare spots more easily.

By my mode of making the mould for chilling, I am enabled to give any desired depth to the chill, and, at the same time, keep the shoe the desired shape.

What I claim as my invention, and desire to secure by Letters Patent, is—

The mould for casting sleigh-shoes, constructed and arranged as shown and described.

JOHN W. DRYER.

Witnesses:
WM. S. LOUGHBOROUGH,
JAS. LORENZO GAGE.